(12) United States Patent
Lin

(10) Patent No.: US 8,077,860 B2
(45) Date of Patent: Dec. 13, 2011

(54) ACCESSORY STRUCTURE FOR PORTABLE ELECTRONIC DEVICES

(75) Inventor: Yi-Pang Lin, Tu-Cheng (TW)

(73) Assignee: Chi Mei Communication Systems, Inc., Tu-Cheng, New Taipei (TW)

(*) Notice: Subject to any disclaimer, the term of this patent is extended or adjusted under 35 U.S.C. 154(b) by 111 days.

(21) Appl. No.: 12/579,799

(22) Filed: Oct. 15, 2009

(65) Prior Publication Data
US 2010/0237222 A1    Sep. 23, 2010

(30) Foreign Application Priority Data
Mar. 21, 2009    (CN) .......................... 2009 1 0301007

(51) Int. Cl.
*H04M 1/00*    (2006.01)
*H04M 9/00*    (2006.01)

(52) U.S. Cl. .................................. 379/447; 379/428.01

(58) Field of Classification Search .................. 206/578; 248/183.3, 183.2, 454; 396/424; 455/556.1, 455/575.1; 345/168; 379/428.01, 441, 447, 379/450
See application file for complete search history.

(56) References Cited

U.S. PATENT DOCUMENTS

| | | | | |
|---|---|---|---|---|
| 5,517,683 A * | 5/1996 | Collett et al. | ............... | 455/575.1 |
| 6,782,273 B2 * | 8/2004 | Ono et al. | ................... | 455/550.1 |
| 6,792,246 B2 * | 9/2004 | Takeda et al. | ................. | 455/41.1 |
| 7,016,711 B2 * | 3/2006 | Kurakane | .................... | 455/575.1 |
| 7,626,634 B2 * | 12/2009 | Ohki et al. | ...................... | 348/373 |
| 7,658,557 B2 * | 2/2010 | Lu | ................... | 396/428 |
| 7,751,092 B2 * | 7/2010 | Sambongi et al. | ............ | 358/474 |
| 2004/0113036 A1 * | 6/2004 | Gilbert | ....................... | 248/346.01 |
| 2009/0111515 A1 * | 4/2009 | Joo | ............................. | 455/556.1 |
| 2010/0230561 A1 * | 9/2010 | Chang | ......................... | 248/183.3 |

* cited by examiner

*Primary Examiner* — Davetta W Goins
*Assistant Examiner* — Phylesha Dabney
(74) *Attorney, Agent, or Firm* — Altis Law Group, Inc.

(57) ABSTRACT

An accessory structure for portable electronic device includes a primary member and a resisting member. The primary member includes a seat and a supporting plate. The seat defines a recessed portion. The supporting plate includes a flexible portion allowing the seat to be bent relative to the supporting plate. The resisting member is received in the recessed portion. The resisting member is rotatably attached to the recessed portion.

18 Claims, 7 Drawing Sheets

ACCESSORY STRUCTURE FOR PORTABLE ELECTRONIC DEVICES

BACKGROUND

1. Technical Field

The present disclosure relates to accessory structures, particularly, to an accessory structure for portable electronic devices such as portable telephones, portable computers, and etc.

2. Description of Related Art

With rapid development of information technology, portable electronic devices, such as cellular phones, personal digital assistant (PDA), and so on, are become more and more popular. The portable electronic device typically includes a display window and an accessory structure such as supporting structure. The supporting structure is used to support the portable electronic device on a platform allowing a more convenient way of viewing the display window. However, conventional accessory structure includes many elements, which may affect the appearance of the portable electronic device.

Therefore, there is room for improvement within the art.

BRIEF DESCRIPTION OF THE DRAWINGS

Many aspects of the accessory structure can be better understood with reference to the following drawings. The components in the drawings are not necessarily drawn to scale, the emphasis instead being placed upon clearly illustrating the principles of the accessory structure. Moreover, in the drawings, like reference numerals designate corresponding parts throughout the several views, in which.

DETAILED DESCRIPTION OF THE EMBODIMENTS

Figure 1:
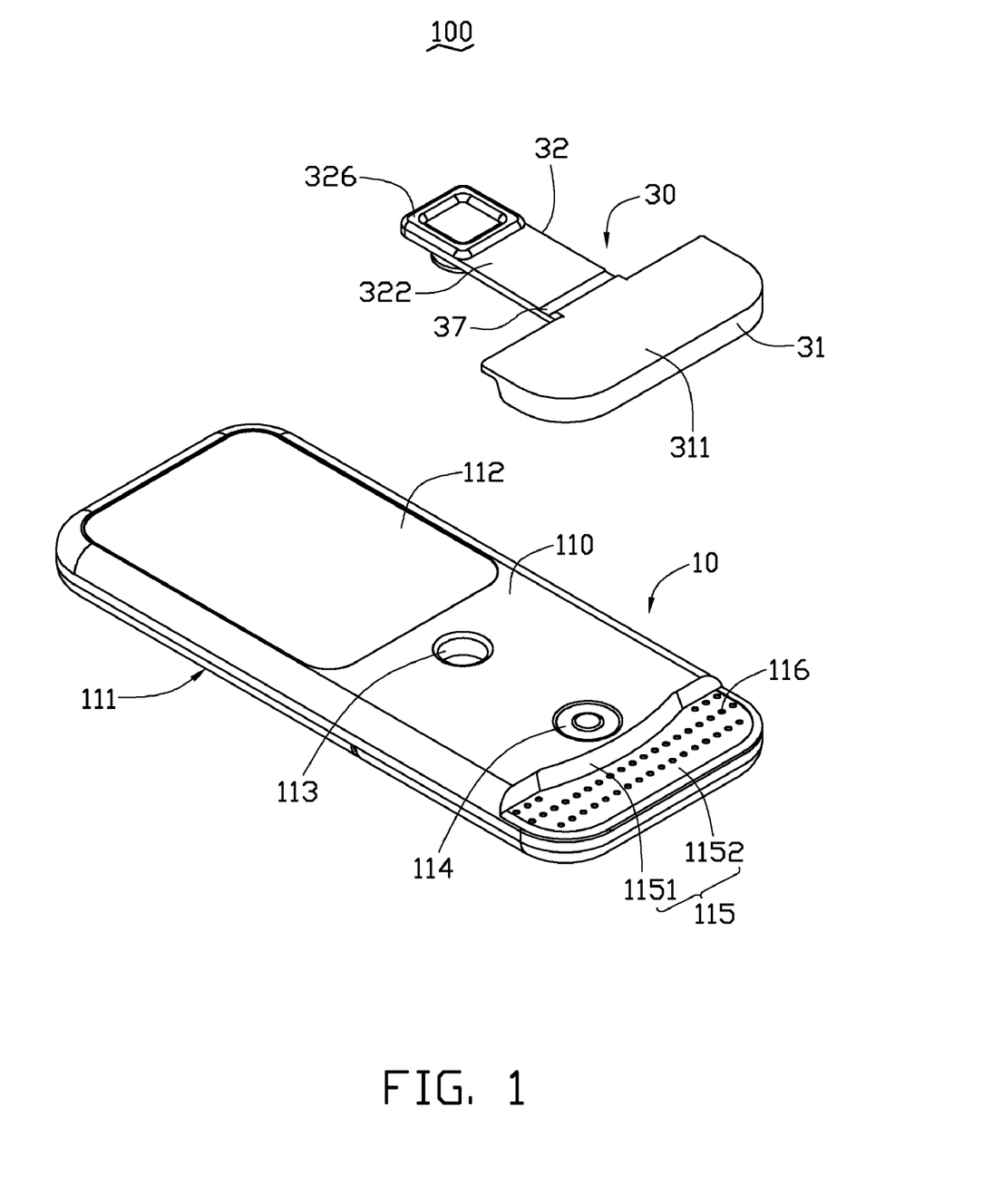
FIG. 1 is an exploded, schematic view of a portable electronic device, in accordance with an exemplary embodiment, the portable electronic device including a main body and an accessory structure.

FIG. 1 shows an exemplary embodiment of an accessory 30 applied to a portable electronic device 100 such as a mobile phone. The portable electronic device 100 includes a main body 10.

The main body 10 includes an upper surface 110, a lower surface 111 and two opposite sidewall 118. A display 112 and a video camera 114 are arranged on the upper surface 110. One end of the main body 10 is recessed at the upper surface 110 to form a receiving portion 115. The receiving portion 115 distant from the display 112, and includes a curve side surface 1151 and a bottom surface 1152. A speaker (not shown) is positioned beneath the bottom surface 1152, and a plurality of sound holes 116 are defined in the bottom surface 1152 for allowing sound from the speaker to transmit. The main body 10 defines a latching hole 113 between the display 112 and the receiving portion 115. The latching hole 113 is a stepped, blind hole. The video camera 114 is positioned adjacent to the receiving portion 115, and the center of the video camera 114 is coaxial with the latching hole 113.

Figure 2:
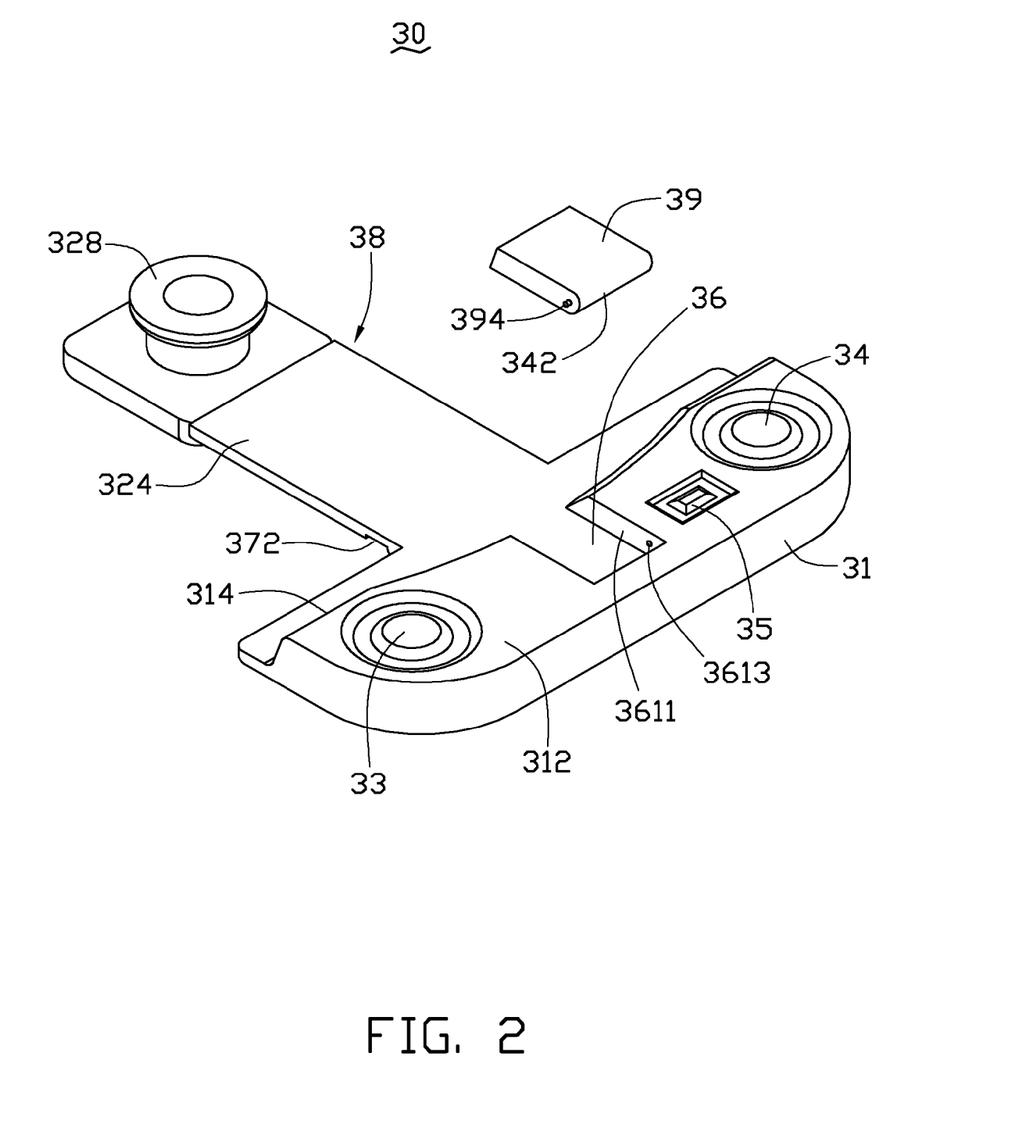
FIG. 2 is a schematic view of the accessory structure shown in FIG. 1.

Also referring to FIG. 2, the accessory structure 30 includes a primary member 38 and a resisting member 39. The primary member 38 is substantially T-shaped, and includes a seat 31 and a supporting plate 32.

The shape of the seat 31 is fit to match the receiving portion 115 of the main body 10. The seat 31 includes a first flat surface 311 and a second flat surface 312. The first flat surface 311 is opposite to the second flat surface 312. A magnet 33, a camera module 34 and a flash 35 are arranged in the second flat surface 312. The magnet 33 and the camera module 34 are respectively positioned at two ends of the seat 31. The position of the magnet 33 corresponds to that of the speaker. The flash 35 is positioned adjacent to the camera module 34. The seat 31 defines a recessed portion 36 between the magnet 33 and the camera module 34. The recessed portion 36 includes two sidewalls 3611, and each sidewall 3611 defines a pivot hole 3613 for rotatably connecting the resisting member 39.

The supporting plate 32 is integrally formed with of the seat 31, and includes a first surface 322 and a second surface 324. A direction key 326 and a rotating portion 328 are arranged at a distal end of the supporting plate 32. The direction key 326 is positioned on the first surface 322 and the rotating portion 328 is positioned on the second surface 324. The supporting plate 32 includes a flexible portion 37 allowing the supporting plate 32 to be bent relative to the seat 31. In order to improve the flexibility of the flexible portion 37, the supporting plate 32 defines a notch 372.

The primary member 38 has circuitries positioned therein for electrically connecting the camera module 34, the flash 35 and the direction key 326. The rotating portion 328 is electronically connected to the circuitries of the primary member 38, for electrically transmitting electronic signal to a main circuit board (not shown) of the main body 10.

The size of the resisting member 39 is fit to be received in the recessed portion 36. The resisting member 39 includes an arcuate end 392 and two pivots 394 extending from two sides of the arcuate end 392. The pivots 394 are respectively engaged in the pivot holes 3613, so that the resisting member 39 is rotatable relative to the primary member 38.

Figure 3:
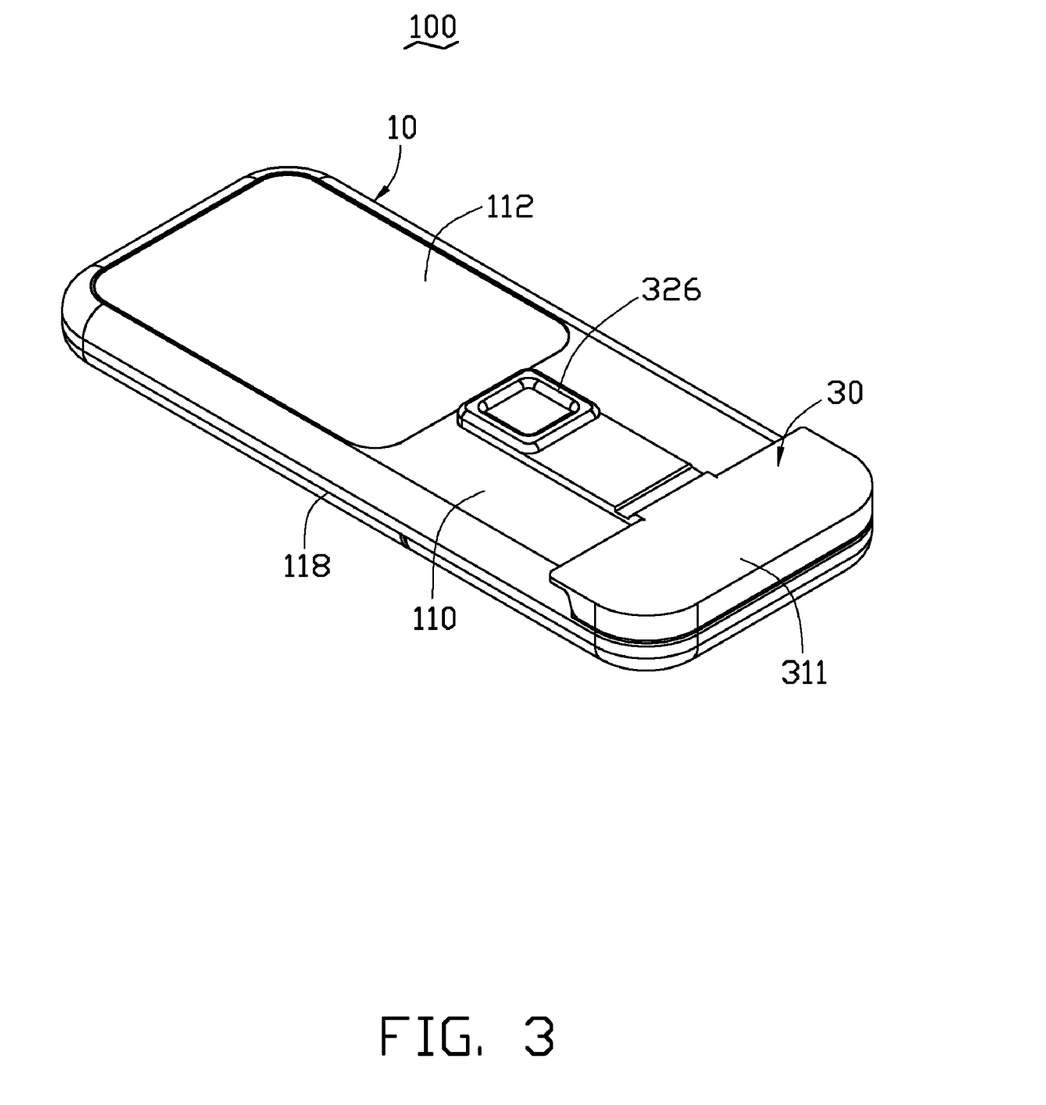
FIG. 3 is an assembled, schematic view of the portable electronic device shown in FIG. 1.

In assembly of the accessory structure 30 to the main body 10, referring to FIG. 3, the rotating portion 328 is engaged in the latching hole 113, and the seat 31 is received in the recessed portion 115. The magnet 33 is attracted by a magnetic member of the speaker beneath the bottom surface 1152, so that the accessory structure 30 is firmly attached to the main body 10. The supporting plate 32 covers the video camera 114 and the camera module 34, and the flash 35 are protected beneath the first flat surface 311, so that the video camera 114, the camera module 34 and the flash 35 are prevented from scraping or dust.

Figure 4:
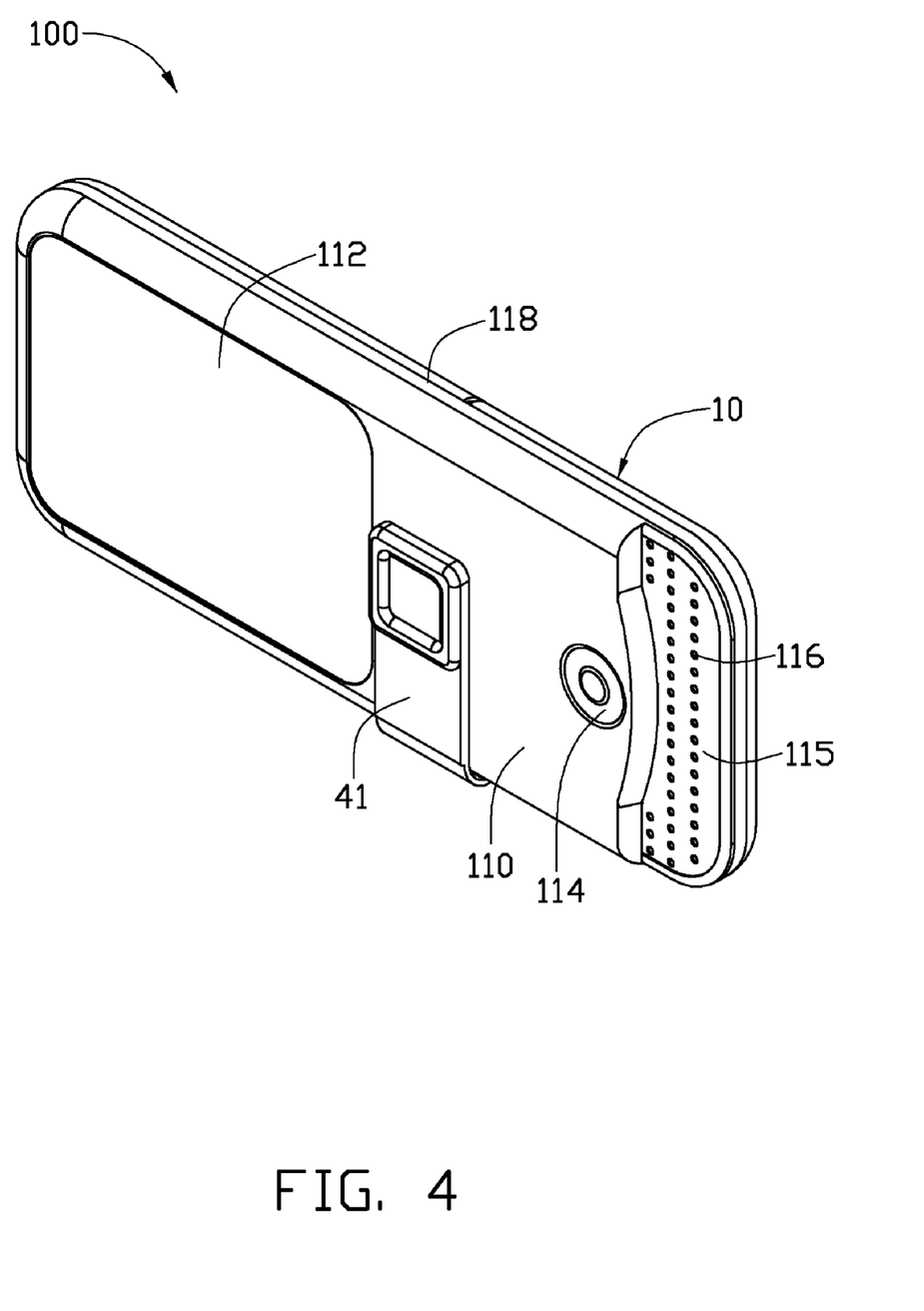
FIG. 4 is a schematic view of the portable electronic device shown in FIG. 1, showing the accessory structure in a working state.
Figure 5:
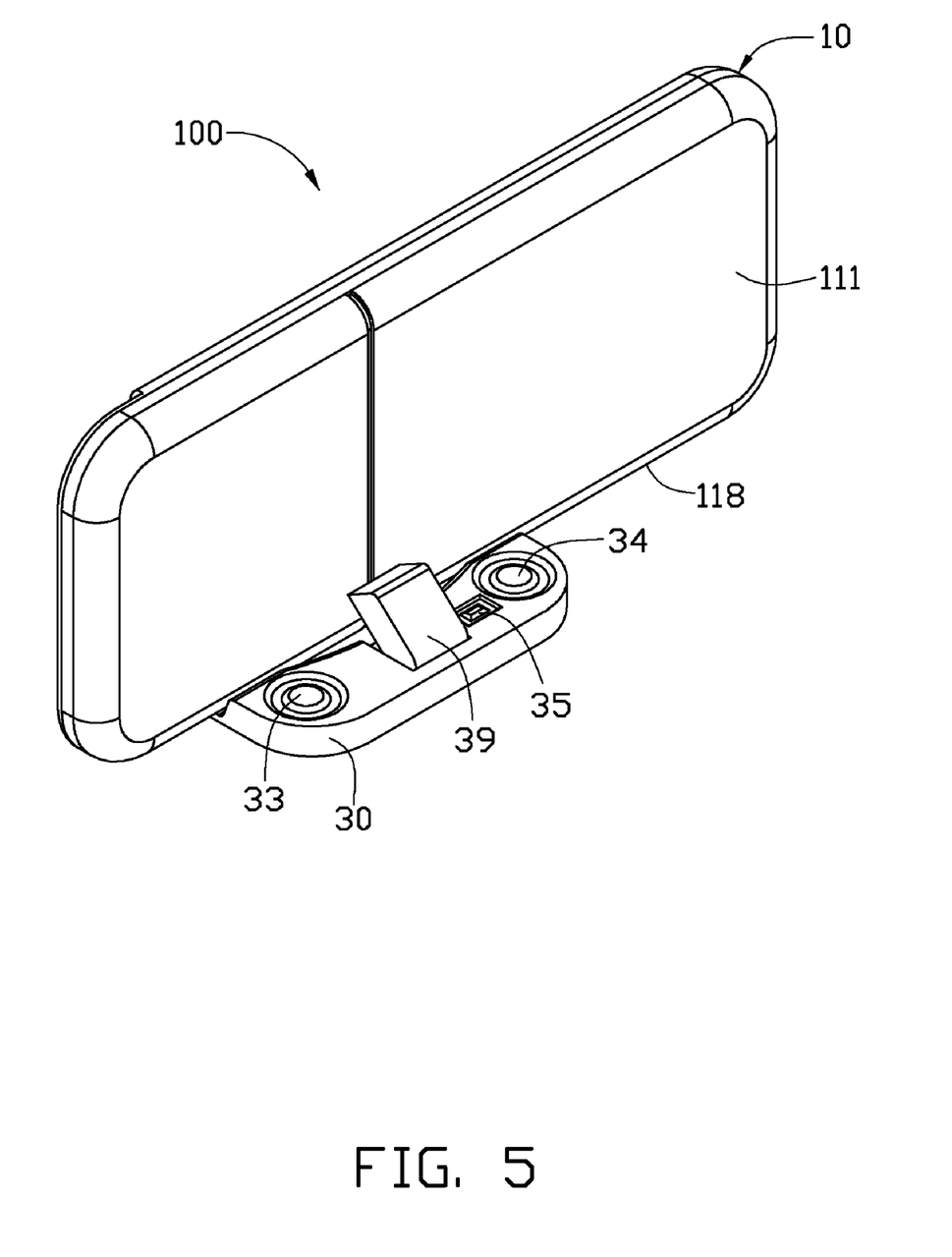
FIG. 5 is similar to FIG. 4, but showing from another aspect.

In use, referring to FIGS. 4-5, the seat 31 is bent up along the flexible portion 37 and is rotated to be parallel to one of the two sidewalls 118. The seat 31 is pushed backward the display 112 until being perpendicular to the display 112. The flexible portion 37 is bent to cling to the sidewall 118 of the main body 10, and the side surface 1151 matches the sidewall 118 at another side of the main body 10. The resisting member 39 is rotated to resist the lower surface 111 of the main body 10. The seat 31 is then laid on a platform, so as to support the main body 10. The view angle of the display 112 may be alterable by adjusting the resisting member 39. Thus, users can conveniently watch movies or video chat with others via the display 112.

Figure 6:
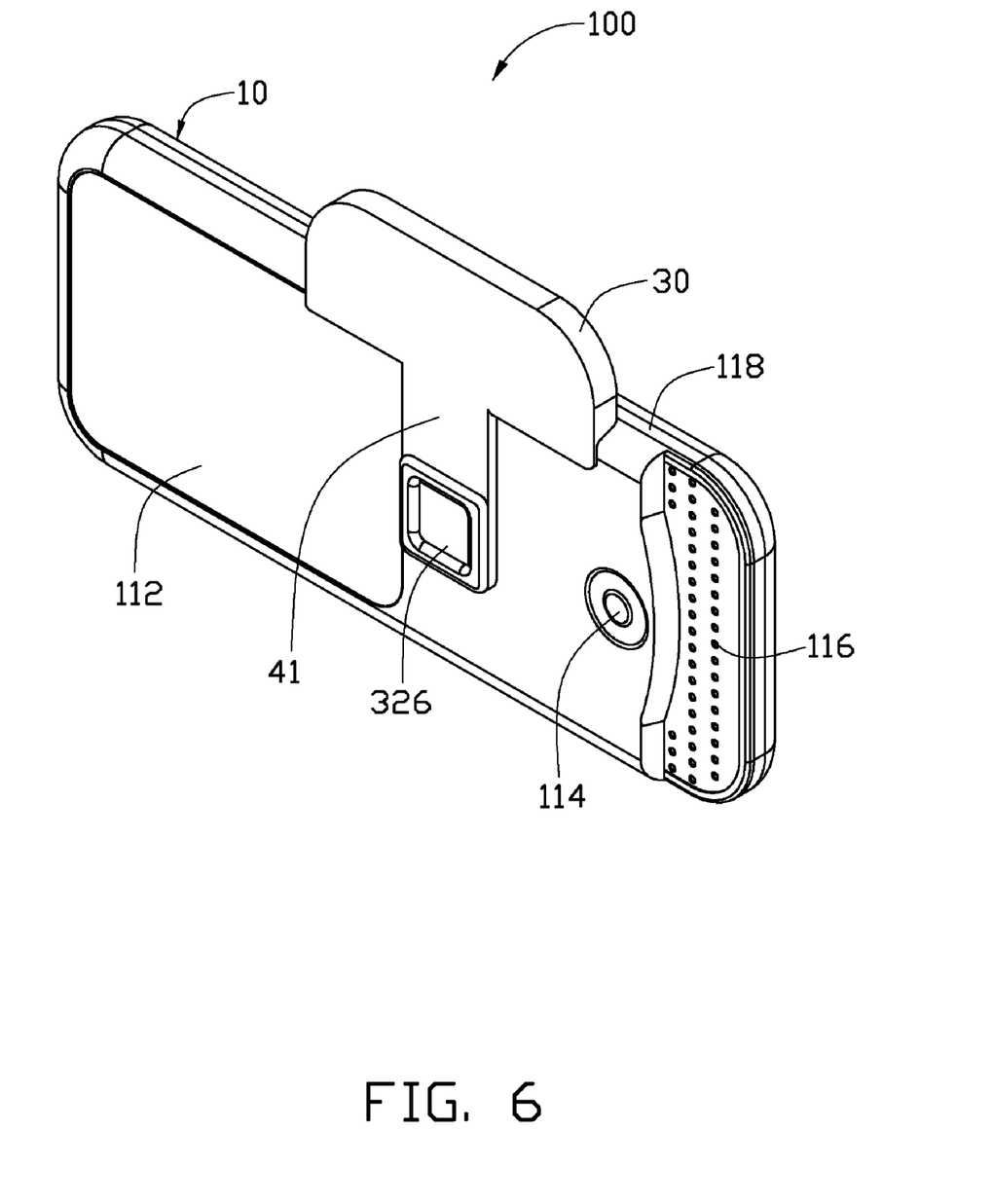
FIG. 6 is similar to FIG. 4, but showing the accessory structure in another working state.
Figure 7:
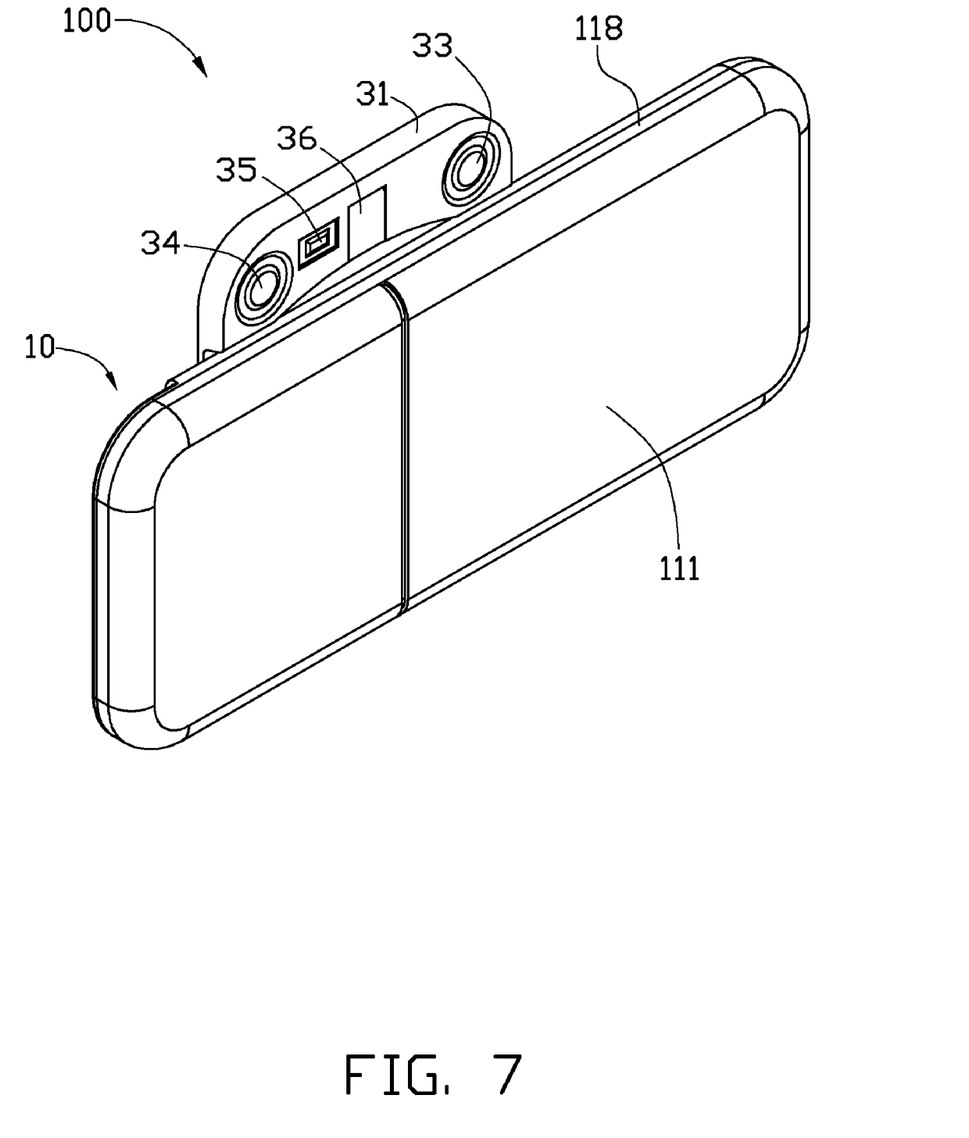
FIG. 7 is similar to FIG. 6, but showing from another aspect.

When users use the camera module 34 to take photos, referring to FIGS. 6-7, the seat 31 just needs to be pushed up and be rotated to a state that the camera module 34 and the flash 35 are exposed. The accessory structure 30 can be positioned by the side surface 1151 matching a sidewall 118 of the main body 10. In this way, users can operate the direction key 326 to control the camera module 34 and the flash 35.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An accessory structure for a portable electronic device comprising:
    a primary member including a seat and a supporting plate; the seat defining a recessed portion; a camera module set in the seat; the supporting plate including a flexible portion, the flexible portion allowing the seat to be bent relative to the supporting plate; a rotating portion formed on the supporting plate; the rotating portion and the camera module positioned at the same side of the primary member;
    a magnet set in the seat for fixing the seat to a portable electronic device by magnetic force; and
    a resisting member received in the recessed portion, the resisting member being rotatably attached to the recessed portion.

2. The accessory as claimed in claim 1, wherein a flash are set in the seat adjacent to the camera module, and the flash, the recessed portion and the magnet are positioned at a side of the primary member, similar to the rotating portion and the camera module.

3. The accessory as claimed in claim 1, wherein the resisting member comprises two pivots at two sides thereof, and the recessed portion defines two pivot holes for receiving the pivots.

4. A portable electronic device comprising:
    a main body including a receiving portion at one end thereof, a video camera set on the main body; and
    an accessory structure including:
        a primary member including a seat and a supporting plate; a flexible portion being positioned at one end of the supporting plate to connect the seat; the seat defining a recessed portion; the supporting plate being rotatably attached to the main body, the supporting plate covering the video camera when the seat is received in the receiving portion of the main body; and
        a resisting member received in the recessed portion, the resisting member being rotatably attached to the recessed portion, the seat being bent up along the flexible portion so as to hold the main body with the resisting member.

5. The portable electronic device as claimed in claim 4, wherein the main body comprises a display, a rotating portion formed on the supporting plate, the main body further defines a latching hole for receiving the rotating portion.

6. The portable electronic device as claimed in claim 5, wherein the video camera is positioned between the latching hole and the receiving portion.

7. The portable electronic device as claimed in claim 5, wherein the camera module and the flash are electrically connected to the main body by the rotating portion.

8. The portable electronic device as claimed in claim 7, wherein the receiving portion defines a plurality of sound holes for allowing sounds from inside of the main body to pass.

9. The portable electronic device as claimed in claim 8, wherein a magnet is set in the seat so as to fix the seat to the main body by magnetic force, the magnet and the camera module are positioned at two sides of the seat, and the recessed portion is formed between the magnet and the camera module.

10. The portable electronic device as claimed in claim 9, wherein, a direction key is set at one end of the supporting plate, the direction key and the rotating portion are positioned at two opposite sides of the supporting plate, and the direction key is electrically connected with the main body by the rotating portion.

11. The portable electronic device as claimed in claim 4, wherein the main body includes a sidewall, the receiving portion includes a side surface, and the seat includes an arcuate surface matching the side surface and the sidewall.

12. The portable electronic device as claimed in claim 4, wherein the resisting member includes an arcuate end, two pivots respectively extend from two sides of the arcuate end, and the recessed portion defines two pivots holes for receiving the pivots.

13. The portable electronic device as claimed in claim 4, wherein the primary member is T-shaped.

14. A portable electronic device comprising:
    a main body including an upper surface, a lower surface opposite to the upper surface and a sidewall connecting the upper surface and the lower surface, a display being set on the upper surface, a receiving portion being defined in the upper surface at one end of the main body, the receiving portion including a bottom surface; and
    an accessory structure including:
        a primary member including a seat and a supporting plate; the supporting plate including a flexible portion connecting the seat; the seat being received in the receiving portion of the main body and defining a recessed portion; the supporting plate being rotatably attached to the main body; and
        a resisting member rotatably attached to the recessed portion;
    wherein the seat is bent up from the receiving portion and is rotated to parallel to the sidewall, and one end of the resisting member is rotated to resist the lower surface of the main body when the flexible portion is bent to cling to the sidewall so as to support the main body.

15. The portable electronic device as claimed in claim 14, wherein the main body further defines a latching hole in the upper surface between the display and the receiving portion, a rotating portion is formed at one end of the supporting plate, and the rotating portion is engaged in the latching hole.

16. The portable electronic device as claimed in claim 15, wherein a magnet, a camera module and a flash are set in the seat and at a same size of the rotating portion, and the camera module and the flash are electrically connected to the main body by the rotating portion.

17. The portable electronic device as claimed in claim 16, wherein the receiving portion includes a side surface, and the seat includes an arcuate surface matching the side surface and the sidewall.

18. The portable electronic device as claimed in claim 14, wherein the primary member is T-shaped.

* * * * *